H. FLECKL AND W. J. BOYD.
SLEIGH RUNNER ATTACHMENT FOR BABY CARRIAGES AND OTHER VEHICLES.
APPLICATION FILED SEPT. 18, 1919.
1,343,046.
Patented June 8, 1920.
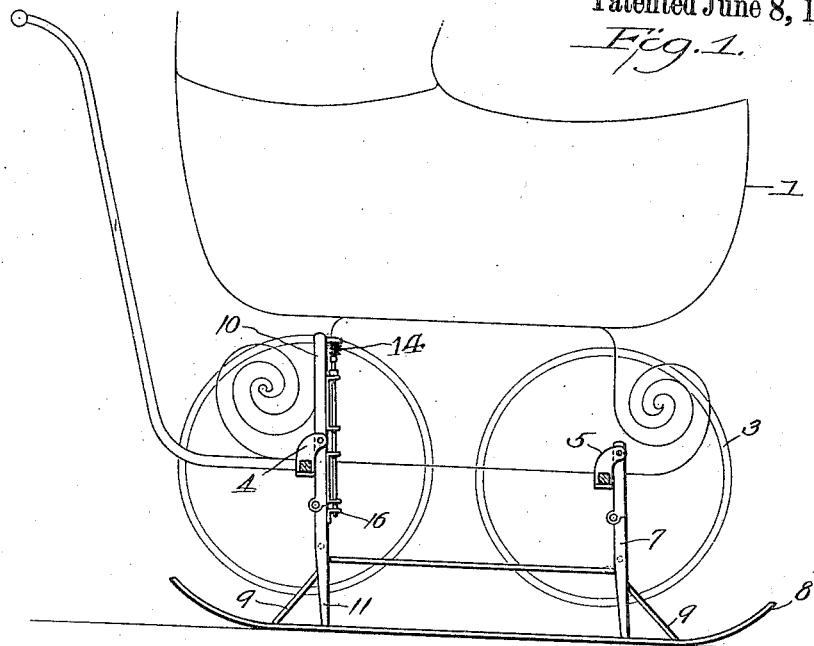
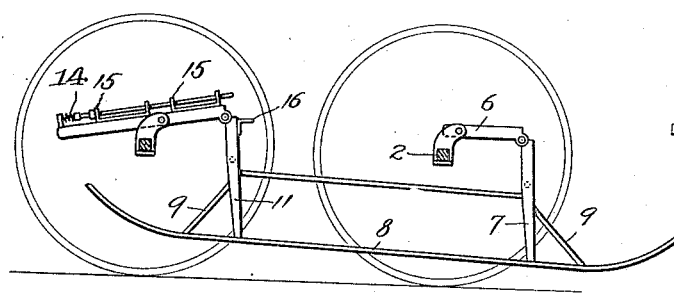
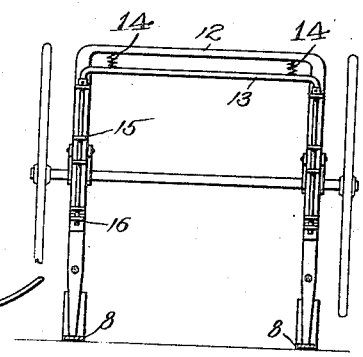
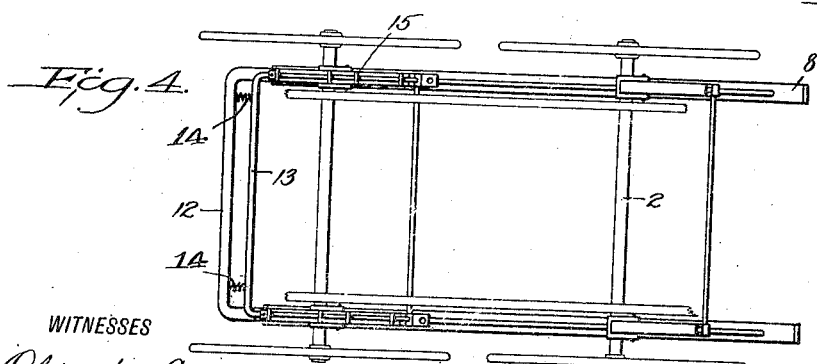
WITNESSES
INVENTORS
H. FLECKL
W. J. BOYD
BY
ATTORNEYS

UNITED STATES PATENT OFFICE.

HANS FLECKL, OF BOYDS, AND WILLIAM JOSEPH BOYD, OF CHEWELAH, WASHINGTON.

SLEIGH-RUNNER ATTACHMENT FOR BABY-CARRIAGES AND OTHER VEHICLES.

1,343,046.   Specification of Letters Patent.   Patented June 8, 1920.

Application filed September 18, 1919. Serial No. 324,441.

*To all whom it may concern:*

Be it known that we, HANS FLECKL, a citizen of the United States, and a resident of Boyds, in the county of Ferry and State of Washington, and WILLIAM JOSEPH BOYD, a citizen of the United States, and a resident of Chewelah, in the county of Stevens and State of Washington, have invented a new and Improved Sleigh-Runner Attachment for Baby-Carriages and other Vehicles, of which the following is a full, clear, and exact description.

This invention relates to a sleigh-runner attachment for vehicles, and aims to provide such a device whereby a vehicle may be instantly adapted to glide over the surface of snow and ice, and by means of which the structure permitting the afore-mentioned function may be rendered inoperative so that the vehicle will be supported upon its conventional wheels.

It is well known that any number of devices have been constructed with a view of providing attachments to ordinary wheeled vehicles whereby the same may be adapted to glide over a frozen surface. These devices have for the most part proven impracticable, for the reason that they are extremely cumbersome and, consequently, difficult to transport and handle. Further, structures adapted to this purpose have ordinarily presented any number of parts, which has greatly added to the weight of the vehicle with which they were associated. Various locking means have also been employed for retaining the runners, or their supporting structure, in engagement with the ground; but it is pointed out that these locking means have in many instances proven impracticable, for the reason that a slight jar would cause the supporting element of the runners to move upwardly so as to again bring the wheels of the vehicle into engagement with the surface over which the vehicle was traveling.

It is our object to provide a runner attachment for vehicles which shall be extremely simple in construction and positive in operation, and to provide, associated with such attachment, locking means which will be likewise simple in construction and by reason of which it will prove impossible for the runners to be moved upwardly unless it is so desired by the operator.

For convenience, we have illustrated our invention as applied to a child's carriage, but we wish it understood that this invention would be readily applicable to any type of vehicle without departing from the invention.

Reference is had to the accompanying drawings which illustrate one practical embodiment of our invention, and in which—

Figure 1 is a sectional side view of our attachment showing a vehicle such as a child's carriage associated therewith, the runners being in this instance in engagement with the surface over which the vehicle is traveling;

Fig. 2 is a similar view but showing the runners in raised position;

Fig. 3 is a sectional front view, the rear portion of its structure disclosing certain details of construction associated with the lock; and Fig. 4 is a plan view of the attachment with the runners in raised position.

In all these views like reference numerals designate similar parts, and the reference numeral 1 indicates the body of a vehicle provided with the usual axles 2, to the ends of which wheels 3 are secured.

Secured to the axles 2 are pairs of projections 4 and 5 respectively. Pivotally secured to the outer ends of the projections 5 are a pair of rods 6, to the inner edge of the lower ends of which there is hingedly secured a pair of rods 7 which serve to support the forward ends of a pair of runners 8, a brace rod 9 being provided to extend between the rod 7 and the runner 8 to provide greater rigidity. A pair of rods 10 are pivotally secured, at a point below the center of their two extremities, to the projections 4. Hingedly secured to the lower end at the lower edge of the rods 10 are a pair of rods 11, to the lower edge of which there are secured the rear part of the runners 8, a brace rod 9 being also provided, if it is desired, between these rods and the runner.

The upper ends of the rods 10 are preferably connected, as clearly shown in Figs. 3 and 4, by means of a cross bar 12. The base of a U-shaped member 13 extends parallel to the crossbar 12 and is normally held in spaced relation thereto by means of interposed springs 14. The legs of the U-shaped member 13 extend downwardly adjacent the rods 10 and project through guides 15 secured to such rods. The lower ends of the legs of the U-shaped member extend beyond the lower ends of the rods 10, so as to be capable of projecting through an opening provided through ears 16, one of which ears is mounted upon each of the rods 11 adjacent their upper ends. In this connection it might be well to note that the distance between the hinged connection existing between rods 6 and 7 and rods 10 and 11 is greater than the distance between the axles 2, for a purpose hereinafter more fully specified. Also, suitable rods may extend between the rods 7 and 11 for bracing purposes.

In operation it will now be appreciated that the vehicle attachment may readily be set in operation, assuming that the parts are in position illustrated in Fig. 2, by grasping the bars 12 and 13 with one hand and gripping the same, whereby to cause the base of the U-shaped member 13 to move closer to the crossbar 12 and, consequently, to retract the legs of the U-shaped member. Upon the rods 10 being swung upwardly into a vertical position, and subsequently releasing the base of the U-shaped member 13, the ends of the legs of such U-shaped member will be caused to pass through the openings in the ear 16, thus preventing any opening of the hinged joint which would result in the parts assuming a collapsed position. It will be noted that by means of the arrangement illustrated, there is no possibility of the parts becoming disarranged; and very little likelihood of such parts breaking exists, in view of the extremely simple construction which is illustrated.

It will be noted that during the upward swinging motion of the rods 10 their lower ends will be caused to move downwardly, consequently resulting in the runners 8 being brought into engagement with the surface over which the vehicle is to travel; and, subsequently, a further swinging motion being imparted to the rods 10, the vehicle will be lifted clear of the ground to the position illustrated in Fig. 1.

Assuming now that it is desired to bring the runners out of engagement with the surface over which the vehicle is to travel, and, consequently, into the position illustrated in Fig. 2. It will be seen that this may readily be accomplished by gripping the base of the U-shaped member 13 and moving the crossbar 12, which will cause the outer ends of the legs of the U-shaped member to move out of engagement with the ears. Upon a downward pull being imparted to the upper ends of the rods 10, the joint between such rods and the rods 11, and, consequently, between the rods 6 and 7, will open and the runners will move upwardly with respect to the vehicle 1, and eventually will assume and be retained in the position illustrated in Fig. 2, by virtue of the fact that, as aforestated, the distance between the hinged connections existing between the rods 6 and 7 and 10 and 11 respectively, and the distance between the axles 2, is not equal, the former being greater than the latter, which will result in the rods 6 moving to an approximately horizontal position, while the lower ends of the rods 10 will move beyond an equal horizontal plane to that in which the upper ends of the projections 4 lie. This will cause the upper rod 10 to assume an inclined position, as clearly shown in Fig. 2, which position, due to the rigid connection existing between the lower ends of the rods 11 and the runners 8, the rods 10 will retain until forcibly swung past the same by the operator of the vehicle.

From the foregoing it will be seen that we have constructed a sleigh-runner attachment for vehicles which will fulfil all the purposes set forth in the preamble of our specification, and by arranging the hinged connection between the rods 6 and 7 and 10 and 11 respectively, adjacent the rear edges of such rods, it will be impossible for the runners 8 to move upwardly during the usual operation of the vehicle without the base of the U-shaped member 13 being moved toward the crossbar 12, thus permitting an unlocking of the hinged joints existing between such rods and, consequently, the moving forwardly of the runners 8.

For instance if the attachment is to be used on a horse drawn buggy all that is necessary is to interpose a supplemental steel rod between the axle and spring bar, clamped securely to the latter, to attach the aforementioned projections 5 thereto. The pins which connect certain of the parts are necessarily made removable to permit a ready removal or attachment of the device.

Obviously any number of modifications in structure might be resorted to without in the least departing from the scope of our invention.

Having thus described our invention, we desire to claim:

1. A sleigh runner attachment for vehicles, including toggles comprising pairs of rods pivotally secured to one another adjacent their end portion, the upper-most of said rods being adapted to be pivotally secured to the axles of a vehicle, runners secured adjacent the lower-ends of the lower-most rods, the distance between the points of pivotal connection of said rods being greater than the distance between the points of pivoting of said rods to the axles, whereby when said rods connected to said axles are swung to their extreme raised position the parts will be automatically held.

2. A sleigh-runner attachment for vehicles, including a pair of rods adapted to be pivotally secured to the axle of a vehicle, a U-shaped member having its legs slidably mounted upon such rods, rods hingedly secured to the lower ends of such first-named rods, such latter rods being provided with ears formed with openings, the lower ends of the legs of the U-shaped member being adapted to project through such openings, runners secured to the lower ends of such rods, and a further pair of rods having one of their ends secured to another axle of the vehicle, their opposite ends being attached to said runners.

3. A sleigh-runner attachment for vehicles, including a pair of rods adapted to be pivotally secured at their upper ends to an axle of a vehicle, a second pair of rods adapted to be pivotally secured at a point below the center of their extremities to another axle of such vehicle, further rods hingedly secured to the lower ends of the first-named rods, runners secured to the lower ends of such latter rods, the rods mounted intermediate their extremities being secured together by means of a crossbar, a U-shaped member slidably mounted upon such rods and having its base portion extending parallel to such crossbar, springs interposed between such crossbar and base of the U-shaped member, and ears mounted upon the lower-most set of rods adjacent their upper ends, the lower ends of the legs of the U-shaped member being adapted to pass through such ears.

HANS FLECKL.
WILLIAM JOSEPH BOYD.